Patented Dec. 19, 1950

2,534,897

UNITED STATES PATENT OFFICE 2,534,897

OXADIAZOLOPYRIMIDINES AND METHOD OF PREPARING THE SAME

James H. Boothe, Pearl River, and Coy W. Waller, Nanuet, N. Y., assignors to American Cyanamid Company, New York, N. Y., a corporation of Maine No Drawing. Application January 14, 1950, Serial No. 138,699

6 Claims. (Cl. 260—251)

This invention relates to new organic compounds. More particularly, it relates to oxadiazolopyrimidines and methods of preparing the same.

The compounds of the present invention may be illustrated by the following structural formula:

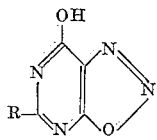

in which R is a member of the group consisting of hydroxyl and amino radicals.

The compounds of the present invention are white solids somewhat soluble in water but soluble to a greater extent in alkaline aqueous solutions. They decompose at high temperatures, usually without melting.

The compounds of the present invention may be prepared by reacting 4-hydroxy-5-aminopyrimidines or salt thereof with nitrous acid in a solvent. The preferred solvent is water although mixtures of water and small amounts of water miscible solvents, such as ethanol, may be used.

The intermediates used in the present invention, such as 2,5-diamino-4,6-dihydroxypyrimidine and 2,4,6-trihydroxy-5-aminopyrimidine, are known compounds and can be prepared by methods described in the chemical literature.

In carrying out our invention nitrous acid is used to form the oxadiazolo ring with the 4-hydroxy-5-aminopyrimidine. The nitrous acid may be added directly to the reaction mixture, however, it is usually more desirable to form the nitrous acid within the reaction mixture by the action of an acid such as acetic, nitric, hydrochloric, sulfuric, etc. on alkali or alkaline earth nitrites such as sodium nitrite and potassium nitrite. Organic nitrites such as ethyl nitrite and amyl nitrite can be used although they are generally more expensive and less desirable.

The reaction to prepare the compounds takes place readily at temperatures between about 0° C. and 100° C. A convenient method of conducting the reaction is to mix the reactants in a suitable solvent at room temperature or below and after allowing the reaction to proceed a short time, it is completed by a short period of heating on a steam bath.

The product may be isolated from the reaction mixture as an insoluble precipitate by chilling the mixture. The product can be further purified by dissolving in an alkaline solution and precipitating the product by decreasing the pH to about 1.

The product, 5,7-dihydroxy(3,1,2) oxadiazolo-[4,5-d]pyrimidine, can also be prepared from 5-amino-7-hydroxy(3,1,2)oxadiazolo[4,5-d]-pyrimidine by heating in a mineral acid solution with or without the presence of an alkali metal nitrite. By this method the 5-amino group is converted into a hydroxyl radical.

The compounds of the present invention are antagonistic toward guanine and inhibit the growth of micro-organisms which require guanine as a growth factor. They also have been found to have an effect on neoplasms.

The invention will now be illustrated in greater particularity by means of the following specific examples showing the preparation of illustrative oxadiazolopyrimidines from the corresponding 4-hydroxy-5-aminopyrimidines.

Example 1

2.4 g. of 2,5-diamino-4,6-dihydroxypyrimidine sulfate was suspended in about 100–150 cc. of 5 N hydrochloric acid. It was cooled and 0.75 g. of sodium nitrite was added dissolved in water. The pyrimidine did not quite all go in solution so a little more sodium nitrite was added. The solution was filtered and left at room temperature for two hours. It was then warmed on a steam bath thirty minutes and brought to a boil. The solution was cooled and ammonium hydroxide was added to about pH 4. The white precipitate was dissolved in dilute sodium hydroxide, treated with activated charcoal, precipitated with acetic acid, centrifuged, washed well with water, alcohol and ether, and dried. On analysis for carbon, hydrogen and nitrogen the values obtained agreed very closely with the theoretical values for 5-amino-7-hydroxy-(3,1,2)-oxadiazolo[4,5-d]-pyrimidine.

Example 2

One hundred and twenty-five grams of 2,5-diamino-4,6-dihydroxypyrimidine sulfate was dissolved in 30 liters of cold water with 200 cc. of 10 N sodium hydroxide solution. Eighty grams of sodium nitrite was then added. The resulting solution was stirred vigorously and maintained at 5° C. to 10° C. while 500 cc. of concentrated hydrochloric acid was added dropwise through a long stem funnel. The stem of the funnel was immersed in the reaction solution. The mixture was stirred for one hour at 10° C., one at 20° C., and one hour at 50° C., and heated to 80° C. and cooled overnight in the chill room. The product, 5-amino-7-hydroxy-(3,1,2)-oxadiazolo[4,5-d]-pyrimidine, was collected, washed, and dried; weight 86 grams.

The product was further purified by dissolving in four liters of boiling water, using ammonia to affect solution. This hot solution was buffered with ammonium chloride (200 g.) to pH about 9 where crystallization occurred. The total mixture was then brought to pH 1 with concentrated hydrochloric acid, cooled, and filtered. The product was washed and dried; weight 71.5 grams.

*Example 3*

To a slurry of 3 grams of 2,4,6-trihydroxy-5-aminopyrimidine 15 cc. of concentrated hydrochloric acid and 50 cc. of water at 5° C. was added a solution of three grams of sodium nitrite in 15 cc. of water dropwise through a dropper funnel with vigorous stirring and cooling to maintain a temperature of 0° C. to 10° C. The solution was stirred for one hour while it warmed to room temperature; then stirred for one hour at 50° C. where solution was complete. The clear solution was filtered and cooled to 0° C. The product, 5,7-dihydroxy-(3,1,2)-oxadiazolo[4,5-d]-pyrimidine, was collected, washed, and dried; weight 0.3 gram, decomposition point 270°–275° C.

A second crop was obtained by concentrating the above filtrate to dryness, extracting the residue with hot (90° C.) 100 cc. methyl Cellosolve, evaporating off the methyl Cellosolve under vacuum and crystallizing the resulting residue from 10 cc. of water. This second crop was recrystallized from 10 cc. of water a second time; yield, 0.3 gram.

*Example 4*

To a solution of 5.5 grams of 5-amino-7-hydroxy-(3,1,2)-oxadiazolo[4,5-d]-pyrimidine in 100 cc. of 20% sulfuric acid at 90°–95° C. was added dropwise a solution of 27.5 grams of sodium nitrite in 75 cc. of water over a period of 2½ hours while heating on a steam bath and maintaining a temperature of 90°–95° C. by heating on a steam bath with vigorous stirring using a mechanical stirrer. After adding 10 cc. of concentrated sulfuric acid, a second addition of 27.5 g. of sodium nitrite in 75 cc. of water over a 6½ hour period maintaining the above conditions was necessary to complete the reaction. The resulting solution was cooled at 5° C. overnight and filtered. The product was recrystallized from 100 cc. of water; yield 3.5 g. This product had the same ultraviolet absorption and decomposition point as the material in Example 3.

*Example 5*

A mixture of 5 g. of 5-amino-7-hydroxy-(3,1,2)-oxadiazolo[4,5-d]-pyrimidine, 15 cc. of concentrated sulfuric acid (sp. gr. 1.84) and 100 cc. of water was heated to refluxing for 4½ hours. The mixture was filtered and the filtrate cooled. The crystals of 5,7-dihydroxy-(3,1,2)-oxadiazolo[4,5-d]-pyrimidine were collected, washed and dried; weight 3.4 grams.

We claim:

1. Chemical compounds having the general formula:

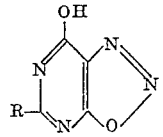

in which R is a member of the group consisting of hydroxyl and amino radicals.

2. 5-amino-7-hydroxy-(3,1,2)-oxadiazolo[4,5-d]-pyrimidine.

3. 5,7-dihydroxy-(3,1,2)-oxadiazolo[4,5-d]-pyrimidine.

4. A method of preparing chemical compounds corresponding to the general formula:

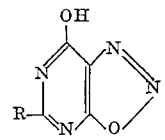

in which R is a member of the group consisting of hydroxyl and amino radicals which comprises mixing together a compound of the group consisting of 2,5-diamino-4,6-dihydroxypyrimidine, 2,4,6-trihydroxy-5-aminopyrimidine and salts thereof with nitrous acid in a solvent.

5. A method of preparing 5-amino-7-hydroxy-(3,1,2)-oxadiazolo[4,5-d]pyrimidine which comprises mixing together 2,5-diamino-4,6-dihydroxypyrimidine sulfate and nitrous acid in a solvent.

6. A method of preparing 5,7-dihydroxy-(3,1,2)-oxadiazolo[4,5-d]pyrimidine which comprises mixing together 2,4,6-trihydroxy-5-aminopyrimidine and nitrous acid in a solvent.

JAMES H. BOOTHE.
COY W. WALLER.

No references cited.